United States Patent
Johansson et al.

(10) Patent No.: US 9,521,083 B2
(45) Date of Patent: Dec. 13, 2016

(54) TRAFFIC DIFFERENTIATOR SYSTEMS FOR NETWORK DEVICES AND RELATED METHODS

(71) Applicant: Anue Systems, Inc., Austin, TX (US)

(72) Inventors: Stefan Johansson, Round Rock, TX (US); David W. McGhee, Austin, TX (US); Shardendu Pandey, Cedar Park, TX (US); Cary J. Wright, Austin, TX (US); Scott Register, Austin, TX (US)

(73) Assignee: Anue Systems, Inc., Austin (*) Notice: Subject to any disclaimer, the term of this patent is extended or adjusted under 35 U.S.C. 154(b) by 106 days.

(21) Appl. No.: 14/164,450

(22) Filed: Jan. 27, 2014

(65) Prior Publication Data

US 2015/0215222 A1     Jul. 30, 2015

(51) Int. Cl.
*H04L 1/00*     (2006.01)
*H04L 12/823*     (2013.01)
(Continued)

(52) U.S. Cl.
CPC .............. *H04L 47/32* (2013.01); *H04L 43/08* (2013.01); *H04L 43/50* (2013.01); *H04L 47/28* (2013.01)

(58) Field of Classification Search
None
See application file for complete search history.

(56) References Cited

U.S. PATENT DOCUMENTS 6,147,976 A * 11/2000 Shand et al. .................. 370/254
6,188,674 B1    2/2001 Chen et al.
(Continued)

FOREIGN PATENT DOCUMENTS

| | | |
|---|---|---|
| EP | 1968235 A1 | 9/2008 |
| EP | 2802103 A1 | 11/2014 |
| WO | WO2008/067371 A2 | 6/2008 |

OTHER PUBLICATIONS

Johansson et al., "Traffic Differentiator Systems for Network Devices and Related Methods Including Automatic Port Order Determination", U.S. Appl. No. 14/570,058, filed Dec. 15, 2014, 43 pgs.

(Continued)

*Primary Examiner* — Jutai Kao
(74) *Attorney, Agent, or Firm* — Egan Peterman Enders Huston

(57) ABSTRACT

Traffic differentiator systems for network devices and related methods are disclosed that determine difference packets from multiple packet streams. Some embodiments are configured to receive two streams of packets with one stream being a processed version of another stream and then to determine difference packets within a lookup time window that is, for example, associated with a processing time for the second stream to be a processed version of the first stream. Difference packets within a lookup time window can also be determined for packets received within a single combined stream of packets. Difference packets and/or related statistical information is then output for additional processing, as desired. The streams of packets can be associated with ingress and egress packets for a network device, and the difference packets and related statistical information can be used to determine packets that are removed, added, and/or modified by the network device.

36 Claims, 8 Drawing Sheets

(51) Int. Cl.
*H04L 12/841* (2013.01)
*H04L 12/26* (2006.01)

(56) References Cited

U.S. PATENT DOCUMENTS

| | | |
|---|---|---|
| 7,203,173 B2 | 4/2007 | Bonney et al. |
| 7,443,889 B2 | 10/2008 | Gonguet et al. |
| 7,496,664 B2 | 2/2009 | Hannel et al. |
| 7,522,606 B1 | 4/2009 | Sendrovitz |
| 7,773,611 B2 | 8/2010 | Booth, III et al. |
| 8,040,891 B2 | 10/2011 | Zhao et al. |
| 8,265,139 B2 * | 9/2012 | Verbrugge et al. ...... 375/240.01 |
| 8,462,781 B2 | 6/2013 | McGhee et al. |
| 8,576,709 B2 | 11/2013 | Yang |
| 2006/0069793 A1 | 3/2006 | Li et al. |
| 2006/0098764 A1 * | 5/2006 | Bergervoet .................... 375/346 |
| 2007/0237185 A1 * | 10/2007 | Pereira et al. ..... H04N 21/2389 370/503 |
| 2009/0028160 A1 * | 1/2009 | Eswaran ............... H04L 45/745 370/395.32 |
| 2011/0182191 A1 | 7/2011 | Jackson |
| 2013/0310055 A1 * | 11/2013 | Dewing .............. H04W 76/025 455/450 |

OTHER PUBLICATIONS

Search Report, GB1423341.5, Jul. 20, 2015, 4 pgs.

\* cited by examiner

TRAFFIC DIFFERENTIATOR SYSTEMS FOR NETWORK DEVICES AND RELATED METHODS

TECHNICAL FIELD OF THE INVENTION

This invention relates to network packet communication systems and, more particularly, to analyzing differences in network packet communication streams.

BACKGROUND

Certain network communication systems utilize network packets for network communications. When packets pass through a network device, such as a firewall device, there is a possibility that some packets will be blocked or added by the device, while other packets will be modified by the network device prior to being passed along as egress packets to other network devices. For example, NAT (network address translation), PAT (port address translation), TTL (time-to-live), tunneling, and/or other protocols applied by the network device can cause modifications to ingress packets prior to their being transmitted along as egress packets by the network device.

To assist in troubleshooting, it is desirable to determine which packets are being removed or modified by a network device and to determine if new packets are being generated by the device itself. Typically, this difference determination is accomplished by storing all packets entering a network device, storing all packets leaving a network device, and conducting a post-processing manual or automated comparison of all stored packets. While this technique can be used to determine removed, modified, or added packets, this post-processing technique is cumbersome, time consuming, and provides no real time information concerning the operations of the network device.

SUMMARY OF THE INVENTION

Traffic differentiator systems for network devices and related methods are disclosed. The disclosed embodiments are configured to receive two streams of packets with one stream being a processed version of another stream and then to determine difference packets between the first and second streams within a lookup time window where the lookup time window, for example, is associated with a processing time for the second stream to be a processed version of the first stream. Difference packets within a lookup time window can also be determined for packets received within a single combined stream of packets. Difference packets and/or related statistical information is then output for additional processing, as desired. The streams of packets can be associated with ingress and egress packets for a network device, and the difference packets and related statistical information can be used to determine packets that are removed, added, and/or modified by the network device. Different features and variations can be implemented, as desired, and related systems and methods can be utilized, as well.

In one embodiment, a traffic differentiator system for network packets includes a packet difference processor configured to determine difference packets within a lookup time window between a first stream of packets and a second stream of packets received by the traffic differentiator system and at least one output port configured to output the difference packets. The second stream of packets represents a processed version of the first stream of packets, and the lookup time window is associated with a processing time for the second stream to be a processed version of the first stream. And the difference packets include packets within the first stream and not within the second stream and packets within the second stream and not within the first stream. For additional embodiments, the packet difference processor can be further configured to output statistical information about the difference packets.

In other embodiments, the traffic differentiator system can further include at least one input port configured to receive the first stream of packets and at least one additional input port configured to receive the second stream of packets. In addition, the first and second streams of packets can be from a single network device. Further, the first stream of packets can include only ingress packets for the network device, and the second stream of packets can include only egress packets for the network device. Still further, the difference packets can represent at least one of packets removed by the network device, packets added by the network device, or packets modified by the network device. Also, the system can include one or more packet filters can be associated with the input ports and configured to drop or pass packets based upon filter rules In further embodiments, the traffic differentiator system can further include a packet signature generator associated with each input port and configured to generate signatures for packets received at the input port, and a signature table associated with each input port and configured to store the signatures, the signature tables being configured to store signatures for the lookup time window. In addition, the packet difference processor can be further configured to perform for each input port at least one lookup between signatures generated for the packets received at that input port and the signature table associated with at least one other input port and to drop packets where matches are found. Further, the packet difference processor can be configured to perform two lookups associated with each input port, and wherein a packet buffer stores packets between the two lookups. Still further, the packet difference processor can perform one lookup associated with each input port, and a packet buffer can store packets before the lookup. For other embodiments, the input ports can be configured to receive ingress packets or egress packets but not both; the packet difference processor can be configured to perform one lookup associated with each input port; and a packet buffer can store packets for each input port configured to receive ingress packets.

In still further embodiments, the first stream of packet can include only ingress packets associated with a network device, and the second packet stream can include only egress packets associated with the network device. In addition, the packet difference processor can be configured to receive a combined packet stream including the first stream of ingress packets and the second stream of egress packets. Further, the traffic differentiator system can further include an input port configured to receive the combined packet stream. Still further, the traffic differentiator system can further include a packet signature generator configured to generate signatures for packets received at the input port and a signature table configured to store signatures for the lookup time window. The packet difference processor can also be configured to perform two lookups associated with the input port and to drop packets where matches are found, and a packet buffer can store packets between the two lookups. For other embodiments, the traffic differentiator system can further include one or more packet filters associated with the input port and configured to drop or pass packets based upon filter rules.

In another embodiment, the method for generating difference packets between streams of network packets includes determining difference packets within a lookup time window between a first stream of packets and a second stream of packets received by a traffic differentiator system and outputting the difference packets. The second stream of packets represents a processed version of the first stream of packets. The lookup time window is associated with a processing time for the second stream to be a processed version of the first stream. And the difference packets include packets within the first stream and not within the second stream and packets within the second stream and not within the first stream. In further embodiments, the method can include outputting statistical information about the difference packets.

In other embodiments, the method includes receiving the first stream of packets with at least one input port for the packet differentiator system and receiving the second stream of packets with at least one additional input port for the packet differentiator system. In addition, the first and second streams of packets can be received from a single network device. Further, the first stream of packets can include only ingress packets for the network device, and the second stream of packets can include only egress packets for the network device. Still further, the difference packets can represent at least one of packets removed by the network device, packets added by the network device, or packets modified by the network device. Also, the method can include applying one or more packet filters to drop or pass packets based upon filter rules.

In further embodiments, the determining step can include generating signatures for packets received at the input ports, storing the signatures for the lookup time window, and comparing signatures to determine difference packets. In addition, the method can include performing for each input port at least one lookup between signatures generated for the packets received at that input port and signatures stored for at least one other input port and dropping packets where matches are found. Further, two lookups can be performed for each input port, and the method can include storing packets between the two lookups. Still further, one lookup can be performed for each input port, and the method can further include storing packets before the lookup. For other embodiments, the input ports can be configured to receive ingress packets or egress packets but not both; a lookup can be performed at each input port for each other input port; and the method can further include storing packets for each input port receiving ingress packets.

In still further embodiments, the first stream of packet can include only ingress packets associated a network device, and the second packet streams can include only egress packets associated with the network device. In addition, the first stream of ingress packets and the second stream of egress packets can be combined to form a combined packet stream. Further, the method can include receiving the combined packet stream at an input port for the packet differentiator system. Still further, the determining step can include generating signatures for packets received at the input port, storing the signatures for the lookup time window, and comparing signatures to determine difference packets. The method can also include performing two lookups between signatures generated for the packets received at the input port and stored signatures and dropping packets where matches are found. For other embodiments, the method can further include applying one or more packet filters to drop or pass packets based upon filter rules.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1:
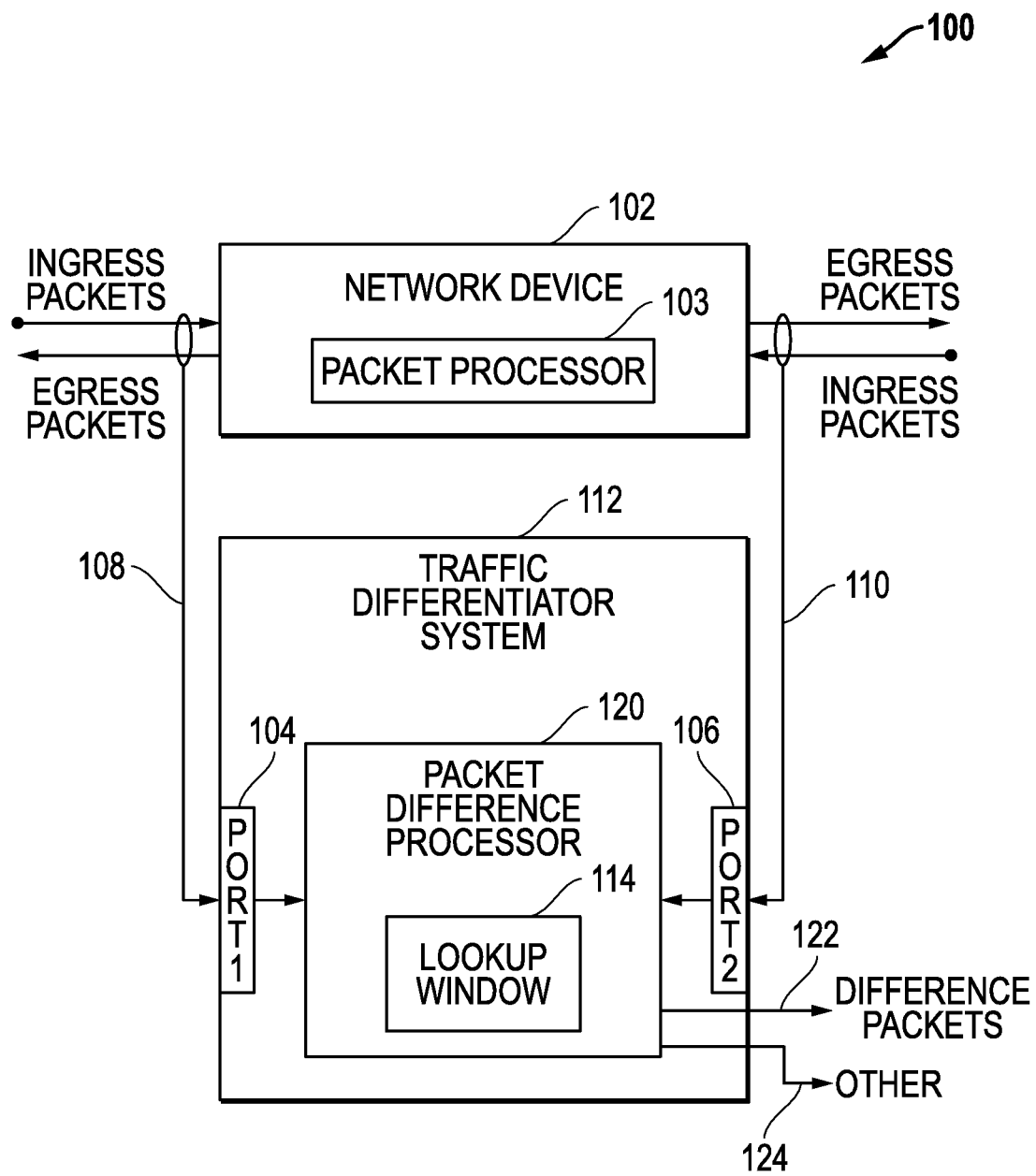
FIG. 1 is a block diagram of an example embodiment for a traffic differentiator system configured to receive ingress/egress packets from multiple ports for a network device.

Traffic differentiator systems for network devices and related methods are disclosed. The disclosed embodiments are configured to receive two streams of packets with one stream being a processed version of another stream and then to determine difference packets between the first and second streams within a lookup time window where the lookup time window, for example, is associated with a processing time for the second stream to be a processed version of the first stream. Difference packets within a lookup time window can also be determined for packets received within a single combined stream of packets. Difference packets and/or related statistical information is then output for additional processing, as desired. The streams of packets can be associated with ingress and egress packets for a network device, and the difference packets and related statistical information can be used to determine packets that are removed, added, and/or modified by the network device. Different features and variations can be implemented, as desired, and related systems and methods can be utilized, as well.

The disclosed embodiments determine differences between ingress/egress packet streams and related information by comparing two or more different packet streams for a network device and forwarding the difference packets that are present in only one of the streams. This difference determination helps to uncover packets that have been removed, modified, or added by a network device. This difference determination can also be applied to packets received within a single combined packet stream. Further, there is no requirement that the packet stream(s) received and processed by the disclosed embodiments include ordered packets and/or ordered packet streams such as typically required where synchronization of two packet streams is being performed. Packet filters can also be utilized by the disclosed embodiments to mask certain packets from this difference processing that are added by the network device, such as TCP ACK (transmission control protocol acknowledge) packets, that are not relevant to the difference analysis ultimately being conducted on the difference packets. Further, the traffic differentiator embodiments can be configured to output statistical or other information (e.g., from packet contents) about difference packets (e.g., removed, modified or added packets) in addition to outputting the difference packets themselves, and the difference packets and related statistical information can be output to a specified port on the traffic differentiator system for further analysis by an external network monitoring tool. Still further, the traffic differentiator systems and methods described herein can be used to determine differences between one or more ingress packet streams and one or more egress packet streams for a network device. As such, difference packets and related information can be output by the disclosed embodiments and used to analyze real-time operations of a wide variety of network devices (e.g., firewalls, load balancers, routers, switches, and/or other network elements).

FIG. 1 is a block diagram of an example embodiment 100 for a traffic differentiator system 112 configured to receive ingress/egress packets from multiple ports for a network device 102. The network device 102 is configured to receive ingress packets associated within one or more ports and to output processed versions of these packets as egress packets on one or more ports using a packet processor 103. The ports for the network device 102 can be ports configured to receive only ingress packets, only egress packets, or both ingress and egress packets. As such, the packet streams 108 and 110 received with respect to ports for the network device 102 can also include ingress only packets, egress only packets, or both ingress and egress packets. It is noted that if the packet streams 108/110 include both ingress and egress packets, these packets can be tagged with additional information to facilitate a determination of whether a difference packet was added, modified, or deleted by a network device 102. If no additional tagging information is used to determine if packets are ingress or egress packets, a determination may only be able to be made that a packet is a difference packet without being able to determine whether this difference packet represents an added packet, a modified packet, or a dropped packet.

The traffic differentiator system 112 is configured to receive at a first port 104 copies of the ingress/egress packets 108 and to receive at a second port 106 copies of the ingress/egress packets 110. The traffic differentiator system 112 determines differences between ingress packets and egress packets using the packet difference processor 120. As described in more detail below, a lookup time window 114 is used to determine a timing window within which the packet difference processor 120 looks for packet differences, and this lookup time window 114 can be associated with the processing time for the packet processor 103 as packets move through the network device 102. The results of this difference processing can include, for example, determining packets that are removed by the network device 102, packets that are added by the network device 102, packets that are modified by network device 102, and/or other desired difference results or statistical information. The traffic differentiator system 112 can be configured to output information associated with the difference processing, such as difference packets 122 (e.g., removed, added, or modified packets) and/or other information 124 related to the difference processing and difference packets.

It is noted that for embodiment 100, it is assumed that the first and second ports 104/106 receive both ingress and egress packets. Further, it is assumed that ingress packets received at the first port 104 are intended to be received as egress packets at the second port 106. Similarly, it is assumed that ingress packets are intended to be received at the second port 106 are received as egress packets at the first port 104. The traffic differentiator system 112 is configured to determine the difference between packets received at the first and second ports 104/106. Further, where the ingress or egress type of the packets are known, the traffic differentiator system 112 can be configured to output removed packets separately from added/modified packets. In particular, ingress packets received at the first port 104 and not received as egress packets at the second port 106 are deemed to be packets removed by the network device 102. Egress packets received at the second port 106 and not received as ingress packets at the first port 104 are deemed to be packets added or modified by the network device 102. Similarly, ingress packets received at the second port 106 and not received as egress packets at the first port 104 are deemed to be packets removed by the network device 102. Egress packets received at the first port 104 and not received as ingress packets at the second port 106 are deemed to be packets added or modified by the network device 102. As such, the traffic differentiator system can output difference packets 122 as well as other desired information 124 and can more particularly output removed packets and added/modified packets where the ingress/egress packet type is known for received packets.

Figure 2:
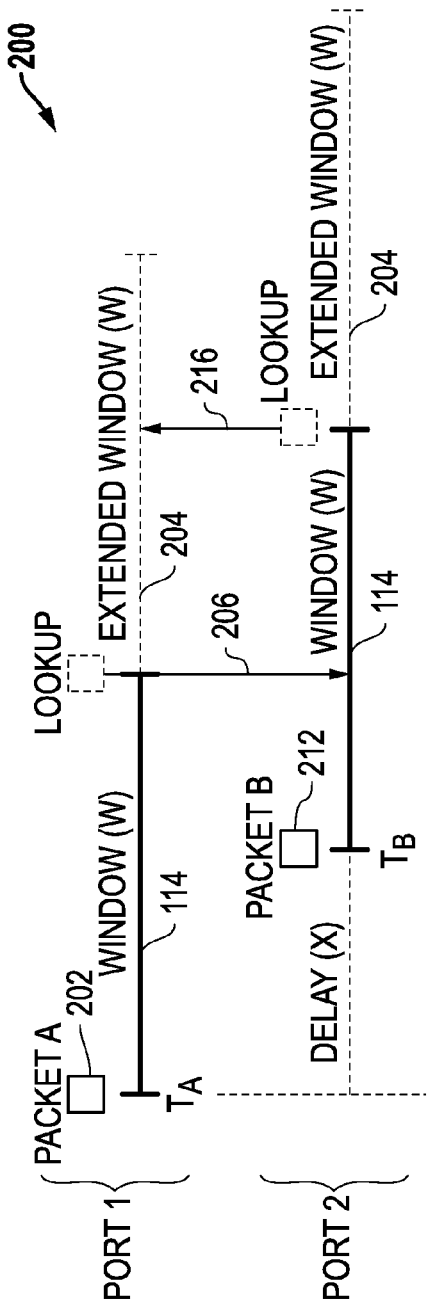
FIG. 2 is a representative timing diagram of an example embodiment for processing ingress/egress packets received from the network device using a single lookup operation per port and an extended lookup time window.

FIG. 2 is a representative timing diagram of an example embodiment 200 for processing ingress/egress packets received from the network device 102 using one lookup operation per port and an extended lookup time window 204. For embodiment 200, it is assumed that each port 104/106 is configured to receive both ingress and egress packets from ports for the network device 102. As described herein, the traffic differentiator system 112 uses a lookup time window (W) 114 to facilitate the difference processing of ingress and egress packets, and this lookup time window 114 can be associated with the processing time for the packet processor 103 for the network device 102 as packets move through the network device 102.

First, assume a packet (PACKETA) 202 is an ingress packet associated with the first port (PORT1) 104 and received by the traffic differentiator system 112 at time $T_A$. As an ingress packet received at the first port 104, a related egress packet (PACKETB) 212 should be received at the second port (PORT2) 106 at time $T_B$. Time $T_B$ is some time delay (X) after time $T_A$ where the time delay (X) is associated with the processing delay as the packet travels through the network device 102. To account for this time delay (X), the lookup time window (W) 114 is used to delay a lookup operation 206 performed to compare the ingress packet (PACKETA) 202 received at the first port 104 with packets received at the second port 106, such as the packet (PACKETB) 212. The lookup time window (W) 114 is selected so as to be greater than or equal to the processing time delay (e.g., W≥X). The lookup operation 206 is configured to determine whether or not the ingress packet (PACKETA) 202 has been received as an egress packet (PACKETB) 212 at the second port 106.

Second, assume packet (PACKETB) 212 is an egress packet associated with the second port (PORT2) 106. This egress packet (PACKETB) 212 can again be assumed to have been received at time $T_B$ by the packet differentiator system 112. As an egress packet received at the second port 106, a related ingress packet (PACKETA) 202 should have been received some time delay (X) earlier at time $T_A$ at the first port 104, where this time delay (X) is again associated with the processing delay through the network device 102. A lookup time window (W) 114 is again applied before performing a lookup operation 216 to compare the egress packet (PACKETB) 212 received at the second port 106 with packets received at the first port 104, such as the packet (PACKETA) 202. The lookup operation 216 is configured to determine whether or not the egress packet (PACKETB) 212 was previously received as an ingress packet (PACKETA) 202 at the first port 104. The extended lookup time window 204 is needed, as well, because the packet (PACKETA) 202 could otherwise already fall outside the lookup time window 114 when the lookup operation 216 is performed.

For embodiment 200, therefore, because it is not known whether packets 202/212 received with respect to ports 104/106 will be ingress or egress packets, the packets are stored for the length of the lookup time window (W) 114 as well as an additional extended lookup window (W) 204, as well. By storing received packets for two lookup windows (2×W) including the lookup time window (W) 114 and the extend lookup time window (W) 204, a single lookup operation 206/216 can be used with respect to each of the ports 104/106 to determine differences between ingress/egress packets received at the first port 104 and ingress/egress packets received at the second port 106.

Figure 3:
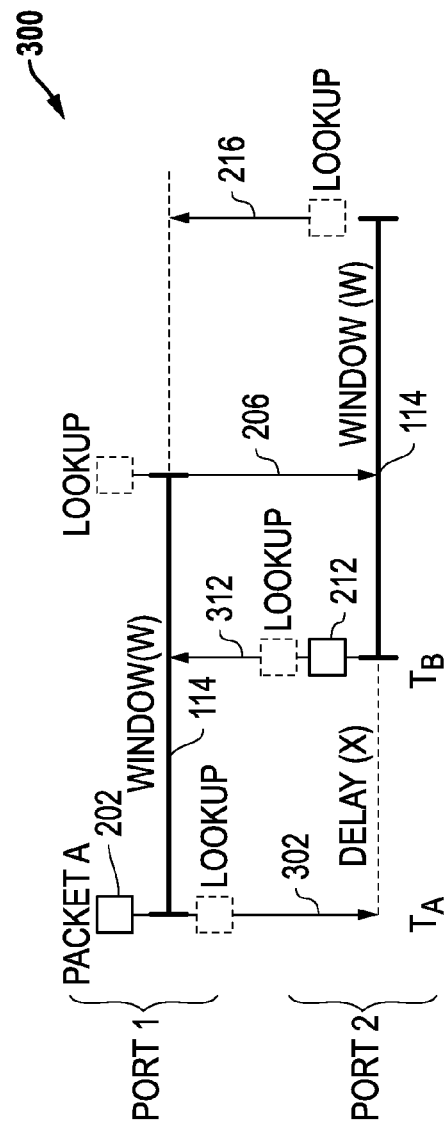
FIG. 3 is a representative timing diagram of an example embodiment for processing ingress/egress packets received from the network device using two lookup operations per port and a lookup time window.

FIG. 3 is a representative timing diagram of an example embodiment 300 for processing ingress/egress packets received from the ports 104/106 using two lookup operations for each port and lookup time window (W) 114. For embodiment 300, the traffic differentiator system 112 again uses a lookup window (W) 114 to facilitate the difference processing of ingress and egress packets but does not use the extended lookup time window (W) 204. It is initially noted that as with embodiment 200, each port 104/106 is assumed to receive both ingress and egress packets associated with ports for the network device 102, and embodiment 300 is configured to handle both ingress/egress conditions at each port.

First, again assume a packet (PACKETA) 202 is an ingress packet associated with the first port (PORT1) 104 and received by the traffic differentiator system 112 at time $T_A$. As an ingress packet received at the first port 104, a related egress packet (PACKETB) 212 should be received at the second port (PORT2) 106 at time $T_B$. Time $T_B$ is some time delay (X) after time $T_A$ where the time delay (X) is again associated with the processing delay as the packet travels through the network device 102. To account for this time delay (X), a lookup time window (W) 114 is again used to delay a lookup operation 206 performed to compare the ingress packet (PACKETA) 202 received at the first port 104 with packets received at the second port 106, such as the packet (PACKETB) 212. The lookup time window (W) 114 is selected so as to be greater than or equal to the time delay (X). The lookup operation 206 is configured to determine whether or not the ingress packet (PACKETA) 202 has been received as an egress packet (PACKETB) 212 at the second port 106. In contrast with embodiment 200 and as described in more detail below, an additional lookup operation 302 is also performed when the packet (PACKETA) 202 is received for conditions where the received packet is an egress packet.

Second, again assume packet (PACKETB) 212 is an egress packet associated with the second port (PORT2) 106 that is received at time $T_B$ by the packet differentiator system 112. As an egress packet received at the second port 106, a related ingress packet (PACKETA) 202 should have been received some time delay (X) earlier at time $T_A$ at the first port 104, where this time delay (X) is again associated with the processing delay through the network device 102. A lookup time window (W) 114 is again applied before performing a lookup operation 216 to compare the egress packet (PACKETB) 212 received at the second port 106 with packets received at the first port 104, such as the packet (PACKETA) 202. The lookup operation 216 is configured to determine whether or not the egress packet (PACKETB) 212 was previously received as an ingress packet (PACKETA) 202 at the first port 104. However, because packet (PACKETB) 212 was an egress packet and only a single lookup window (W) 114 is used to store packets, packet (PACKETA) 202 will no longer be stored when lookup operation 216 is performed. As such, an additional lookup operation 312 is also performed when the packet (PACKETB) 212 is received for this condition where the received packet is an egress packet.

In contrast with embodiment 200, therefore, rather than using an extended lookup window 204 to account for egress packet conditions, additional lookup operations 302/312 are also performed when the packets 202/212 are received. More particularly, the lookup operation 312 is configured to determine whether or not the egress packet (PACKETB) 212 was previously received as an ingress packet (PACKETA) 202 at the first port 104. Similarly, the additional lookup operation 302 is also performed when the packet (PACKETA) 202 is received to handle the case in which this packet is an egress packet rather than an ingress packet. By applying lookup operations 302/312 when the packets 202/212 are received and by applying lookup operations 206/216 after the time window (W) 114, both ingress and egress conditions are handled by embodiment 300.

It is noted that embodiment 200 of FIG. 2 and/or embodiment 300 of FIG. 3 can be used to provide an indication of packets added, modified, and/or removed by the network device 102. However, as these embodiments 200/300 do not track whether packets are ingress or egress packets, these embodiments 200/300 are not able to determine whether differences represent removed packets or added/modified packets. To provide such a determination, additional information can be added or tagged to the packets and/or tracked with respect to the packets as they arrive to indicate whether they are ingress or egress packets. Further, the traffic differentiator system 112 could utilize ports configured only to receive ingress or egress packets from ports on the network device 102 so that it would be known whether a received packet were an ingress packet or an egress packet for the network device 102. As indicated above, ingress packets received on one port but not received as egress packets on another port for the network device 102 can be deemed to be packets removed by the network device 102. Similarly, egress packets received on one port but not received as ingress packets on another port for the network device 102 can be deemed to be packets added or modified by the network device 102. Further, additional processing can be applied to determine additional statistical information about the packets being removed, added, and/or modified by the network device 102. Other variations could also be implemented, as desired, while still utilizing the packet stream difference processing techniques and lookup time windows described herein.

Figure 4A:
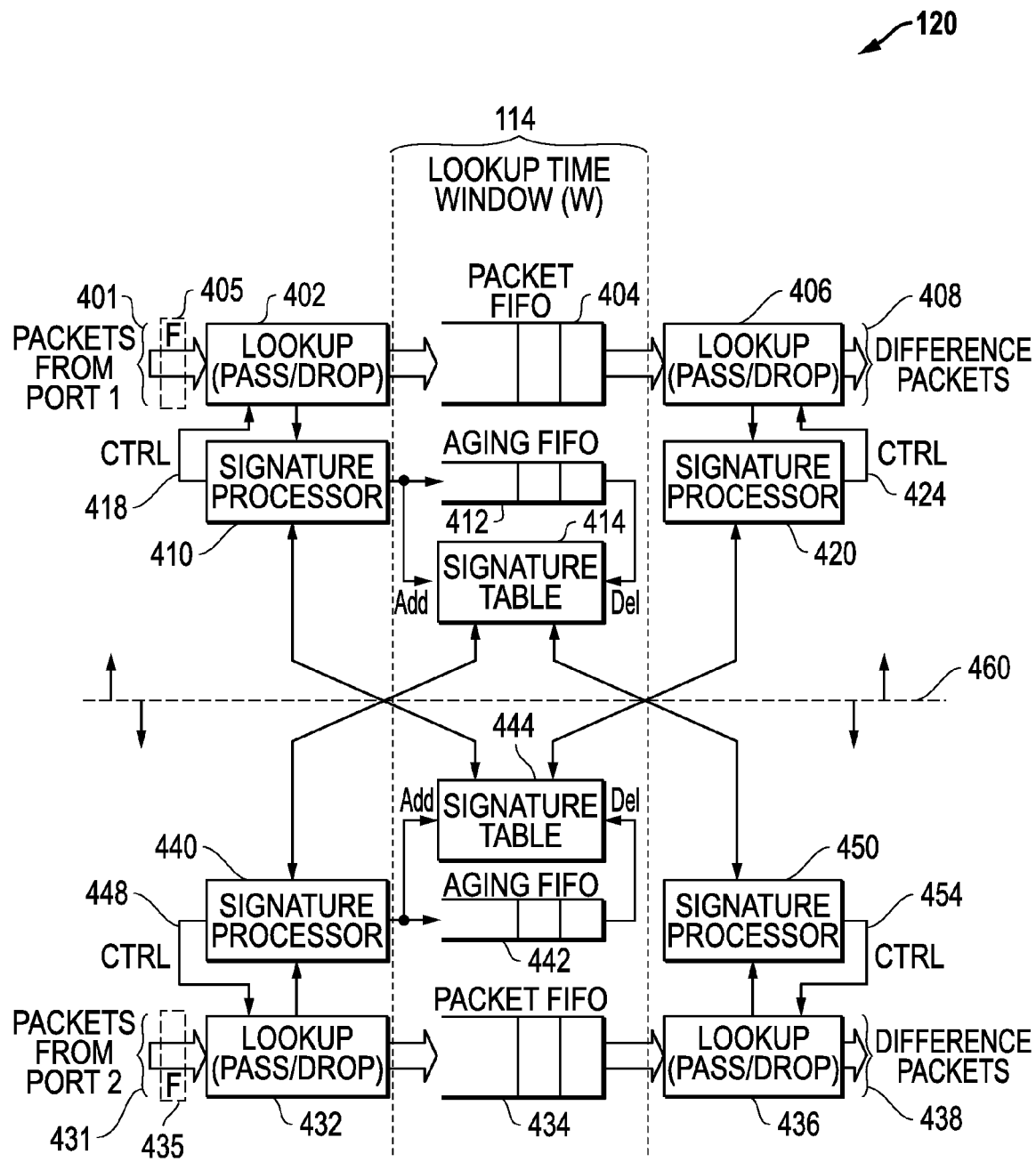
FIG. 4A is a block diagram of an example embodiment for a packet difference processor that is configured to determine differences between ingress/egress packets received at two ports using two lookup operations and a lookup time window.
Figure 4B:
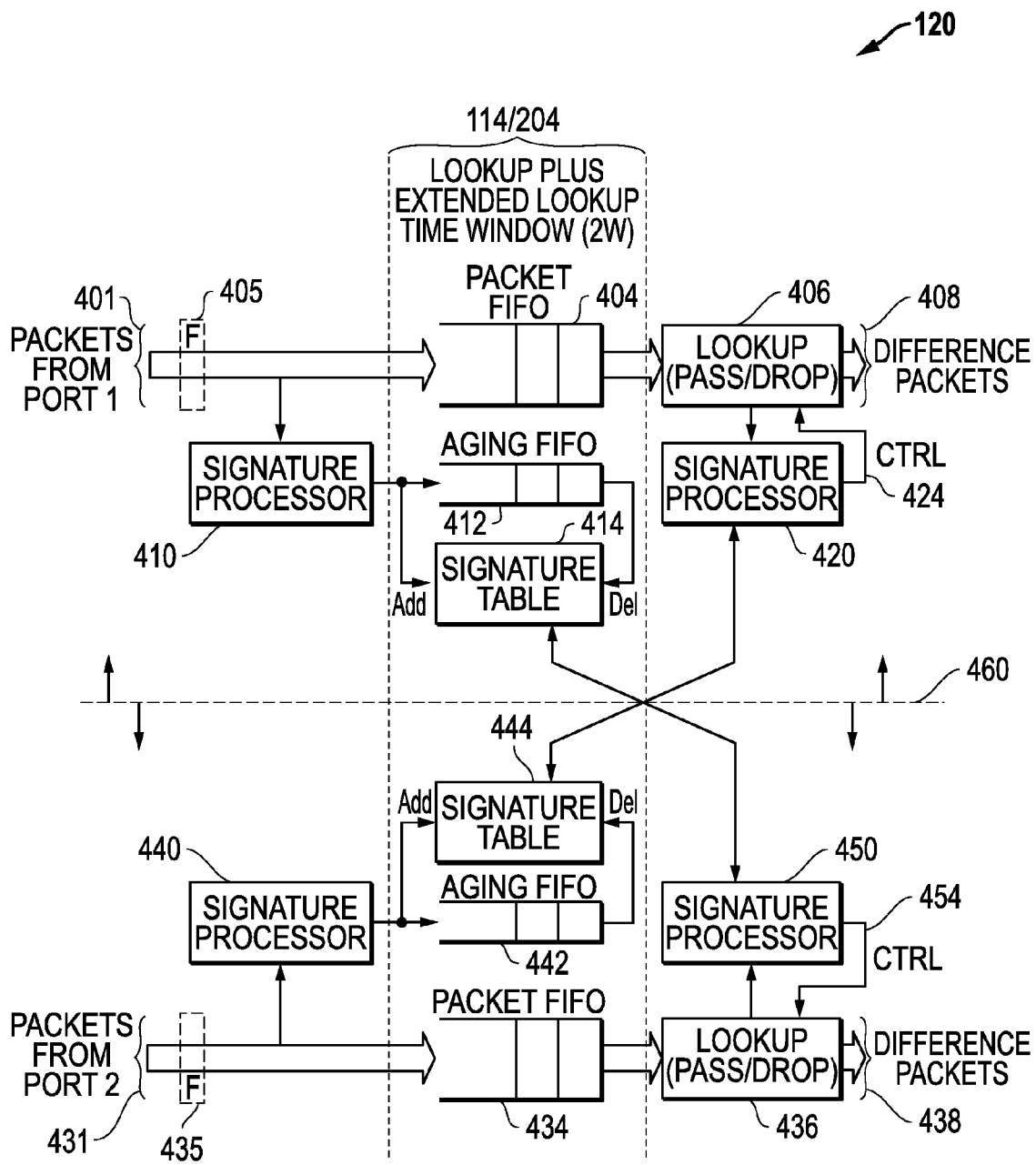
FIG. 4B is a block diagram of an example embodiment for a packet difference processor that is configured to determine differences between ingress/egress packets received at two ports using one lookup operation and an extended lookup time window.
Figure 5:
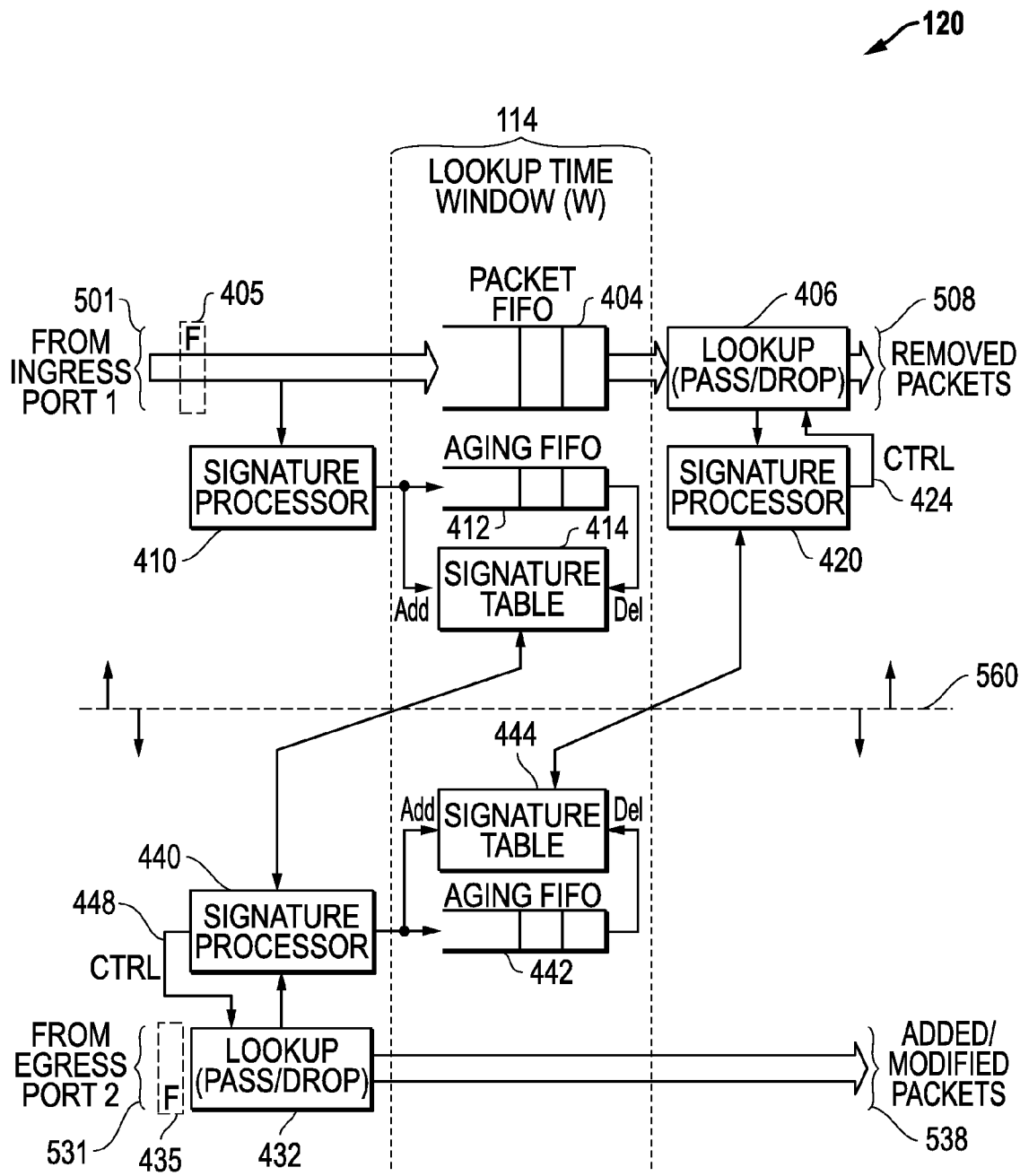
FIG. 5 is a block diagram of an example embodiment for packet difference processor where the ports are configured to receive only ingress packets or only egress packets.

FIGS. 4A-B and 5 are now discussed. These drawings provide example embodiments for the packet difference processor 120. The embodiments of FIGS. 4A-B assume that the packet streams can include ingress and egress packets. The embodiment of FIG. 5 assumes that one input packet stream includes ingress packets and the other input packet stream includes egress packets.

FIG. 4A is a block diagram of an example embodiment for packet difference processor 120 that is configured to determine differences between ingress/egress packets received at two ports using two lookup operations and a lookup time window. The blocks above dashed line 460 represent processing associated with packets 401 received at a first port (PORT1), and blocks below dashed line 460 represent processing associated with packets 431 received at a second port (PORT2). The embodiment depicted performs two lookup operations 402/406 with respect to the packets 401 for the first port (PORT1) and performs two lookup operations 432/436 with respect to packets 431 for the second port (PORT2). The difference packets 408 represent ingress/egress packets 401 received at the first port (PORT1) that were not within the ingress/egress packets 431 received at the second port (PORT2). Similarly, the difference packets 438 represent ingress/egress packets 431 received at the second port (PORT2) that were not within the ingress/egress packets 401 received at the first port (PORT1). It is noted that the lookup time window (W) 114 described above determines how long packets and signature index values are stored within the buffers 404/412/434/442, which are each described in more detail below.

Looking first to the processing above dashed line 460, lookup operation 402 is performed on ingress/egress packets 401 from a first port (PORT1). Lookup operation 402 sends each packet to signature processor 410. The signature processor 410 generates a signature for the packet and sends the signature to signature table 414 to add it to the signatures stored in the signature table 414. The signature processor 410 also sends to aging buffer 412 an index within the signature table 414 for this signature, and this index is stored in aging buffer 412. The aging buffer 412 can be a first-in-first-out (FIFO) buffer or some other desired buffer that stores signature index values for a selected amount of time associated with the lookup time window described herein. When a signature index leaves the aging buffer 412, that index is provided to signature table 414 where it is used to delete the related signature from the signature table 414. As such, the packet signatures are stored for the lookup time window.

In addition to generating a signature and a signature index, the signature processor 410 also communicates with the signature table 444 for the second port (PORT2) to determine whether or not a signature stored within the signature table 444 matches the signature generated for the received packet. This determination is then communicated to lookup operation 402 using a control message (CTRL) 418. If the control message (CTRL) 418 indicates that a match was found, the lookup operation 402 will drop the packet. If the control message (CTRL) 418 indicates that a match was not found, the lookup processor 402 will pass the packet to packet buffer 404 where it is stored. The packet buffer 404 can be a first-in-first-out (FIFO) buffer or some other buffer that stores packets for a selected amount of time associated with the lookup window described herein. Once this lookup window has passed, the packet buffer 404 sends the packet to lookup operation 406. As such, the packets are stored for the lookup time window.

The lookup operation 406 sends each packet it receives from packet buffer 404 to signature processor 420. The signature processor 420 generates a signature for each packet and communicates with the signature table 444 to determine whether or not a signature stored within the signature table 444 matches the signature generated for the packet received from the packet buffer 404. This determination is then communicated to lookup operation 406 using a control message (CTRL) 424. If the control message (CTRL) 424 indicates that a match was found, the lookup operation 406 will drop the packet. If the control message (CTRL) 424 indicates that a match was not found, the lookup processor 406 will output the packet as part of difference packets 408.

Looking now to the processing below dashed line 460, a lookup operation 432 is performed with respect to the ingress/egress packets 431 from a second port (PORT2). Lookup operation 432 sends each packet to signature processor 440. The signature processor 440 generates a signature for the packet and sends the signature to signature table 444 to add it to the signatures stored in the signature table 444. The signature processor 440 also sends to aging buffer 442 an index within the signature table 444 for this signature, and this index is stored in aging buffer 442. The aging buffer 442 can be a first-in-first-out (FIFO) buffer or some other desired buffer that stores signature index values for a selected amount of time associated with the lookup window described herein. When a signature index leaves the aging buffer 442, that index is provided to signature table 444 where it is used to delete the related signature from the signature table 414. As such, the packet signatures are stored for the lookup time window.

In addition to generating a signature and a signature index, the signature processor 440 also communicates with the signature table 414 for the first port (PORT1) to determine whether or not a signature stored within the signature table 414 matches the signature generated for the received packet. This determination is then communicated to lookup operation 432 using a control message (CTRL) 448. If the control message (CTRL) 448 indicates that a match was found, the lookup operation 432 will drop the packet. If the control message (CTRL) 448 indicates that a match was not found, the lookup processor 432 will pass the packet to packet buffer 434 where it is stored. The packet buffer 434 can be a first-in-first-out (FIFO) buffer or some other buffer that stores packets for a selected amount of time associated with the lookup window described herein. Once this lookup window has passed, the packet buffer 434 sends the packet to lookup operation 436. As such, the packets are stored for the lookup time window.

The lookup operation 436 sends each packet it receives from packet buffer 434 to signature processor 450. The signature processor 450 generates a signature for each packet and communicates with the signature table 414 to determine whether or not a signature stored within the signature table 414 matches the signature generated for the packet received from the packet buffer 434. This determination is then communicated to lookup operation 436 using a control message (CTRL) 454. If the control message (CTRL) 454 indicates that a match was found, the lookup operation 436 will drop the packet. If the control message (CTRL) 454 indicates that a match was not found, the lookup processor 436 will output the packet as part of difference packets 438.

It is noted that the difference packets 408 and the difference packets 438 can then be combined to form a single difference packet output. The packet contents for the difference packets 408/438 can also be analyzed to provide additional statistical information concerning the difference packets, as desired. It is further noted that the signature processors 410/420/440/450 can use a variety of techniques to generate signatures for received packets. For example, one or more hash algorithms can be applied to contents of received packets to generate signatures for the received packets. Further, the signature can be calculated using the full contents of the packet or using only select portions of the packet contents, as desired. Using only selected portions of the packet contents allows for one or more packet modifications that are done by the network device 102 to be ignored in the difference determination operations. As such, packets can still be detected as non-different copies of each other even though certain fields may have been updated or modified by the network device 102. For example, where the network device 102 updates the time-to-live (TTL) field within an IP (internet protocol) packet, adds/removes a VLAN (virtual local area network) tag within a packet, and/or performs other modifications to the packets, these packet modifications can be ignored in the difference processing by generating signatures that do not consider these portions of the packet. As described above, the signature is added to the signature tables 414/444, and the index to the signature is added to the aging buffers 412/432. Other signature generation techniques could also be utilized, if desired.

In operation, the embodiment of FIG. 4A will detect removed, modified, and/or added packets between the two ports (PORT1/PORT2) within a certain lookup time window. This lookup time window is determined by the amount of time selected for the packet buffers 404/434 to store packets and for the aging buffers 412/442 to store signature index values. The packet difference processor 120 will detect if a packet is present in both streams as long as the time between the packets is less than the size selected for the lookup time window. As such, packets not within both streams for the ports (PORT1/PORT2) will be output as difference packets, as well as packets that are within both streams but are not received at the ports within the lookup time window.

It is further noted that the packet streams received by the ports (PORT1/PORT2) for the traffic differentiator system 112 could be associated with different network devices and/or sources, if desired. Further, the packet streams being received could be packets streams that have been aggregated from one or more ports/sources. In short, while the traffic differentiator system 112 is useful for comparing differences between packets received by a network device 102 and packets output by that network device 102, the traffic differentiator system 112 can be used to determine difference between any desired packet streams provided to the traffic differentiator system 112.

As indicated above, the lookup time window can be selected based upon the expected processing time it takes for a packet to travel through the network device 102. The size of buffers 404/412/434/442 and the signature tables 414/444 will be dependent upon the amount of time selected for the lookup window. Larger amounts of time will require larger buffers and tables, while smaller amounts of time will require smaller buffers and tables. It is noted that the buffers and tables can be implemented using any desired programmable storage medium, such as random access memory (RAM), FLASH memory, and/or other programmable data storage mediums.

It is further noted that one or more packet filters 405 and 435 can also be used, for example prior to lookup operations 402 and 432, and can be configured to remove packets that are not desired to be considered within the difference processing. For example, these packet filters 405/435 can be used to drop packets having predefined packet types, such as for example packets generated inside the network device 102 that are not of significance. The packet filters 405/435, therefore, can be used to mask selected packets from the difference processing. While the packet filters 405/435 are shown as being in front of lookup operations 402 and 432, packet filters could also be placed in different locations and additional packet filters could be utilized. It is noted that the filters 405/435 can apply one or more filter rules to determine whether or not to pass or drop received packets.

FIG. 4B is a block diagram of an example embodiment for packet difference processor 120 that is configured to determine differences between ingress/egress packets received at two ports using one lookup operation and an extended lookup time window. As described above with respect to embodiment 200 of FIG. 2, the number of lookup operations used by packet difference processor 120 can be reduced if the time lookup window is extended. In such a configuration, for example, the lookup time window (W) 114 can be doubled by adding extended lookup time window (W) 204 to make the overall window twice as long (2W). With this longer time window, only a single lookup operation 406 is then used with respect to packets 401 from PORT1, and the lookup operation 402 is removed. As such, the packets 402 from PORT1 are provided directly to packet buffer 404 and to signature processor 410, and no lookup operation to signature table 444 is conducted by signature processor 410. Similarly, only a single lookup operation 436 is used with respect to packets 431 from PORT2, and the lookup operation 432 is removed. As such, the packets 431 from PORT2 are provided directly to packet buffer 434 and to signature processor 440, and no lookup to signature table 414 is conducted by signature processor 440. While extending the lookup time window reduces the number of lookup operations, this configuration would essentially require doubling of the sizes for the buffers 404/412/434/442 and tables 414/444 as these buffers and tables will be storing twice as many packets, index values, and signatures.

The packet difference processor 120 can be streamlined if ports (PORT1/PORT2) are dedicated to receive ingress or egress packets rather being configured to received both ingress and egress packets. In such a configuration, a port that receives only egress packets does not need to store packets in a packet buffer because any duplicate ingress packet will always be received before its related egress packet. Conversely, a port that receives only ingress packets does not have to do a lookup operation before the packet buffer because any duplicate egress packet will always be received after its related ingress packet.

FIG. 5 is a block diagram of an example embodiment for packet difference processor 120 where the ports (PORT1/PORT2) receive only ingress packets or only egress packets. The blocks above dashed line 560 represent processing associated with ingress only packets 501 received at a first port (PORT1), and blocks below dashed line 560 represent processing associated with egress only packets 531 received at a second port (PORT2). The embodiment depicted performs one lookup operation 406 with respect to the packets 501 and performs one lookup operation 432 with respect to packets 531. The removed packets 508 represent ingress packets 501 received at the first port (PORT1) that were not within the egress packets 531 received at the second port (PORT2). The added packets 538 represent egress packets 531 received at the second port (PORT2) that were not within the ingress packets 501 received at the first port (PORT1). It is noted that the lookup time window (W) 114 described above determines how long packets and signature values are stored within the buffers 404/412/442.

Looking first to the processing above dashed line 560, ingress packets 501 from a first port (PORT1) are provided directly to packet buffer 404 and signature processor 410. As with FIGS. 4A-B, the signature processor 410 generates a signature for the packet and sends the signature to signature table 414 to add it to the signatures stored in the signature table 414. The signature processor 410 also sends to aging buffer 412 an index within the signature table 414 for this signature, and this index is stored in aging buffer 412. When a signature index leaves the aging buffer 412, that index is provided to signature table 414 where it is used to delete the related signature from the signature table 414.

Unlike the embodiment of FIG. 4A but like the embodiment of FIG. 4B, there is no lookup operation positioned in front of packet buffer 404. Rather, all ingress packets 501 are stored within packet buffer 404 for an amount of time determined by the lookup time window 114 described herein. Once this lookup time window (W) 114 has passed, the packet buffer 404 sends the packet to lookup operation 406.

As with FIGS. 4A-B, the lookup operation 406 sends each packet it receives from packet buffer 404 to signature processor 420. The signature processor 420 generates a signature for each packet and communicates with the signature table 444 to determine whether or not a signature stored within the signature table 444 matches the signature generated for the packet received from the packet buffer 404. This determination is then communicated to lookup operation 406 using a control message (CTRL) 424. If the control message (CTRL) 424 indicates that a match was found, the lookup operation 406 will drop the packet. If the control message (CTRL) 424 indicates that a match was not found, the lookup processor 406 will output the packet as part of removed packets 508.

Looking now to the processing below dashed line 560, egress packets 531 from a second port (PORT2) are sent to lookup operation 432. Lookup operation 432 sends each packet to signature processor 440. The signature processor 440 generates a signature for the packet and sends the signature to signature table 444 to add it to the signatures stored in the signature table 444. The signature processor 440 also sends to aging buffer 442 an index within the signature table 444 for this signature, and this index is stored in aging buffer 442. When a signature index leaves the aging buffer 442 after it has been stored for the lookup time window 114, that index is provided to signature table 444 where it is used to delete the related signature from the signature table 414.

As with FIG. 4A but not with FIG. 4B, in addition to generating a signature and a signature index, the signature processor 440 also communicates with the signature table 414 for the first port (PORT1) to determine whether or not a signature stored within the signature table 414 matches the signature generated for the received packet. This determination is then communicated to lookup operation 432 using a control message (CTRL) 448. If the control message (CTRL) 448 indicates that a match was found, the lookup operation 432 will drop the packet. If the control message (CTRL) 448 indicates that a match was not found, the lookup processor 432 will pass the packet. Unlike the embodiment of FIG. 4A, there is no buffer or lookup operation positioned after lookup operation 432 in the embodiment of FIG. 5. Rather, all passed packets from lookup operation 432 are output as added or modified packets 538.

In operation, the embodiment of FIG. 5 will detect packets removed or added/modified by network device 102 between the first ingress ports (PORT1) and the second egress port (PORT2) within a certain lookup time window. As indicated above, this lookup time window determines how long the packet buffer 404 will store ingress packets and how long the aging buffers 412/442 will store signature index values. The packet different processor 120 will detect if a packet is present in both ingress and egress streams as long as the time between the packets is less than the size selected for the lookup time window. As such, packets within a stream for one port but not in the stream for another port (e.g., received at PORT1 but not PORT2 or vice versa) will be output as difference packets, as well as packets that are within both streams but are not received at the egress port (PORT2) within the lookup time window after being received at the ingress port (PORT1).

As indicated above, the lookup time window 114 can be selected based upon the expected processing time it takes for a packet to travel through the network device 102. As also indicated above, the size of buffers 404/412/442 and the signature tables 414/444 will be dependent upon the amount of time selected for the lookup time window. Larger amounts of time will require larger buffers and tables, while smaller amounts of time will require smaller buffers and tables. It is again noted that the buffers and tables can be implemented using any desired programmable storage medium, such as random access memory (RAM), FLASH memory, and/or other programmable data storage mediums. It is also again noted that packet filters and associated filter rules could also be used to further filter packets to be processed, if desired.

Figure 6:
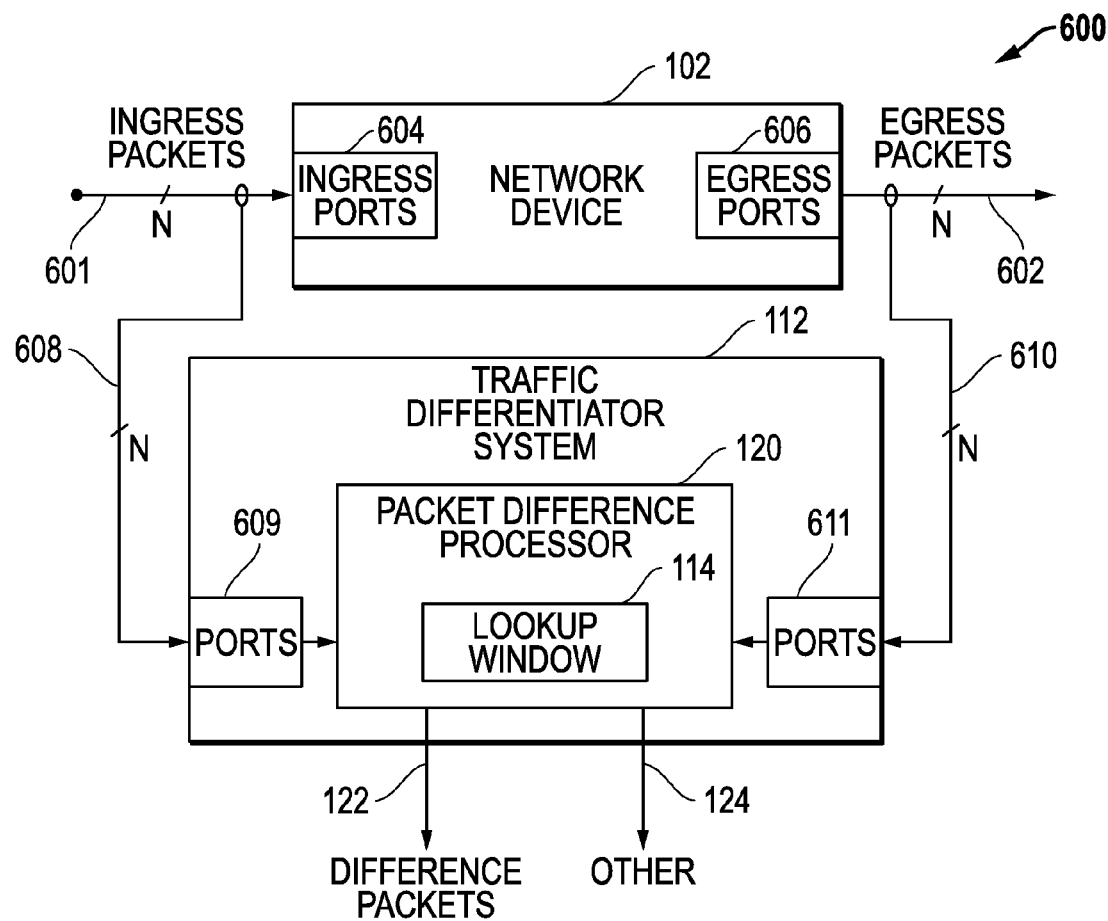
FIG. 6 is a block diagram of an example embodiment for using a traffic differentiator system to determine differences between a plurality of ingress ports and a plurality of egress ports for a network device.
Figure 7:
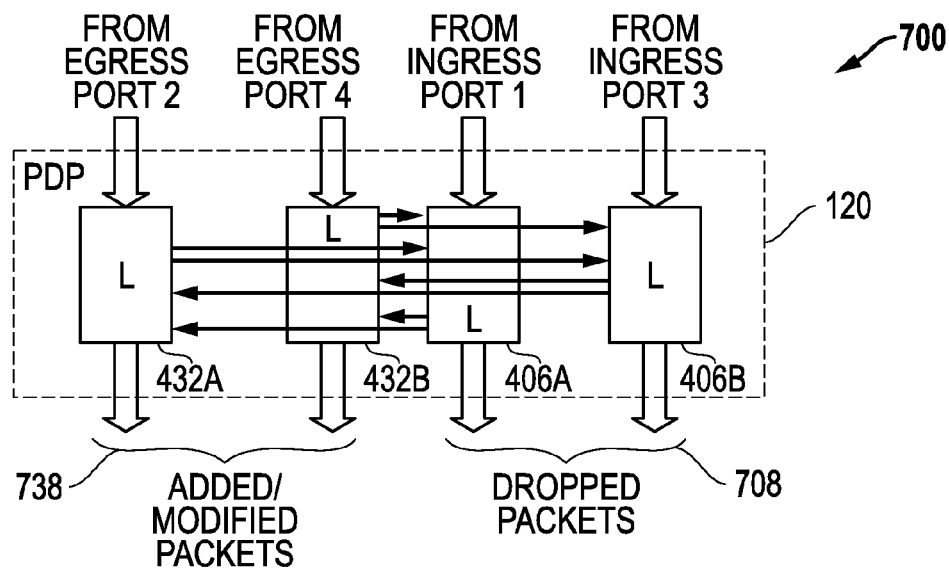
FIG. 7 is a block diagram of an example embodiment where two ingress ports and two egress ports are being processed within a packet difference processor for a traffic differentiator system.

FIGS. 6-7 are now discussed and provide example embodiments where the packet differentiator system 112 is used to provide difference processing for larger numbers of input streams. In addition to determining differences between packet streams received at two ports 108/110 for a network device 102, the packet differentiator system 112 can also be used to determine differences among packet streams received at more than two ports for the packet differentiator system 112. In such configurations, the lookup operations associated with packets received at one port can be configured to communicate with signature tables for two or more other ports to determine if matches exist for packets received at those additional ports. For the discussions of FIGS. 6-7 below, it is assumed that each input packet stream received at a port for the packet differentiator system 112 is associated with a particular port on a network device 102. However, as described herein, the input packet streams can also be from multiple network devices and/or sources, and the packet streams can further represent an aggregation of multiple packet streams. Other variations could also be implemented while still utilizing the lookup time window and difference processing techniques described herein.

The number of lookup operations performed by the packet difference processor 120 for embodiments according to FIGS. 6-7 that are applied to larger numbers of packet streams can be configured to be proportional to the number of ports and can be determined by the type of packets being received at the ports and the difference determinations desired to be made. For example, the number of lookups can be 2*(P−1) using the port processing shown in embodiment FIG. 4B where two lookups are used with respect to each port and where P is the total number of ports. As described above, the number of lookups can be reduced to a single lookup per port if the lookup time window is extended (e.g., doubling the time window). For example, the number of lookups can be P−1 using the port processing shown in embodiment FIG. 4A where an extended lookup time window is used along with a single lookup per port. As described above with respect to FIG. 5, the number of lookups can also be reduced by using ports that receive only ingress packets or that receive only egress packets. For such configurations, ingress port lookups need only be made to egress port signature tables, and egress port lookups need only be made to ingress port signature tables. Thus, the number of lookups can be reduced to P/2 using the port processing shown in FIG. 5 where one lookup is used with respect to each port and where P is the total number of ports split between ingress and egress ports. Other variations could also be implemented while still utilizing the lookup time window and difference processing techniques described herein.

FIG. 6 is a block diagram of an embodiment 600 for using a traffic differentiator system 112 to determine differences between a plurality of ingress ports 604 and a plurality of egress ports 606 for a network device 102. For this embodiment, network device 102 includes N ingress ports 604 that receive ingress packets 601, and copies for these ingress packet streams are received at N ports 609 for traffic differentiator system 112 as N ingress packet streams 608. Network device 102 also includes N egress ports 606 that receive and output egress packets 602, and copies for these egress packets are received at N ports 611 for traffic differentiator system 112 as N egress packet streams 610. For this embodiment 600, the traffic differentiator system 112 determines differences between ingress packet streams and egress packet streams using the packet difference processor 120. The results of this difference processing can include difference packets 122 and/or other desired information 124 related to the difference processing or the difference packets.

FIG. 7 is a block diagram of an embodiment 700 where two ingress ports and two egress ports for the traffic differentiator system 112 are being processed within a packet difference processor (PDP) 120 for the traffic differentiator system 112. A lookup operation 432A is applied to packets received from an egress port (PORT2), and this lookup operation 432A communicates with signature tables associated with the two ingress ports (PORT1, PORT3) as represented by the arrows. Similarly, a lookup operation 432B is applied to packets received from the other egress port (PORT4), and this lookup operation 432B would also communicate with signature tables associated with the two ingress ports (PORT1, PORT3) as represented by the arrows. As also depicted, a lookup operation 406A is applied to packets received from an ingress port (PORT1), and this lookup operation 406A communicates with signature tables associated with the two egress ports (PORT2, PORT4) as represented by the arrows. Similarly, a lookup operation 406B is applied to packets received from the other ingress port (PORT3), and this lookup operation 406B communicates with signature tables associated with the two egress ports (PORT2, PORT4) as represented by the arrows. It is noted that other operational blocks as described above with respect to FIGS. 4A-B and 5 could also be utilized with respect to the dedicated ingress and egress ports. Further, as described above, the results of the difference processing can be added/modified packets 738 and dropped packets 708.

Figure 8:
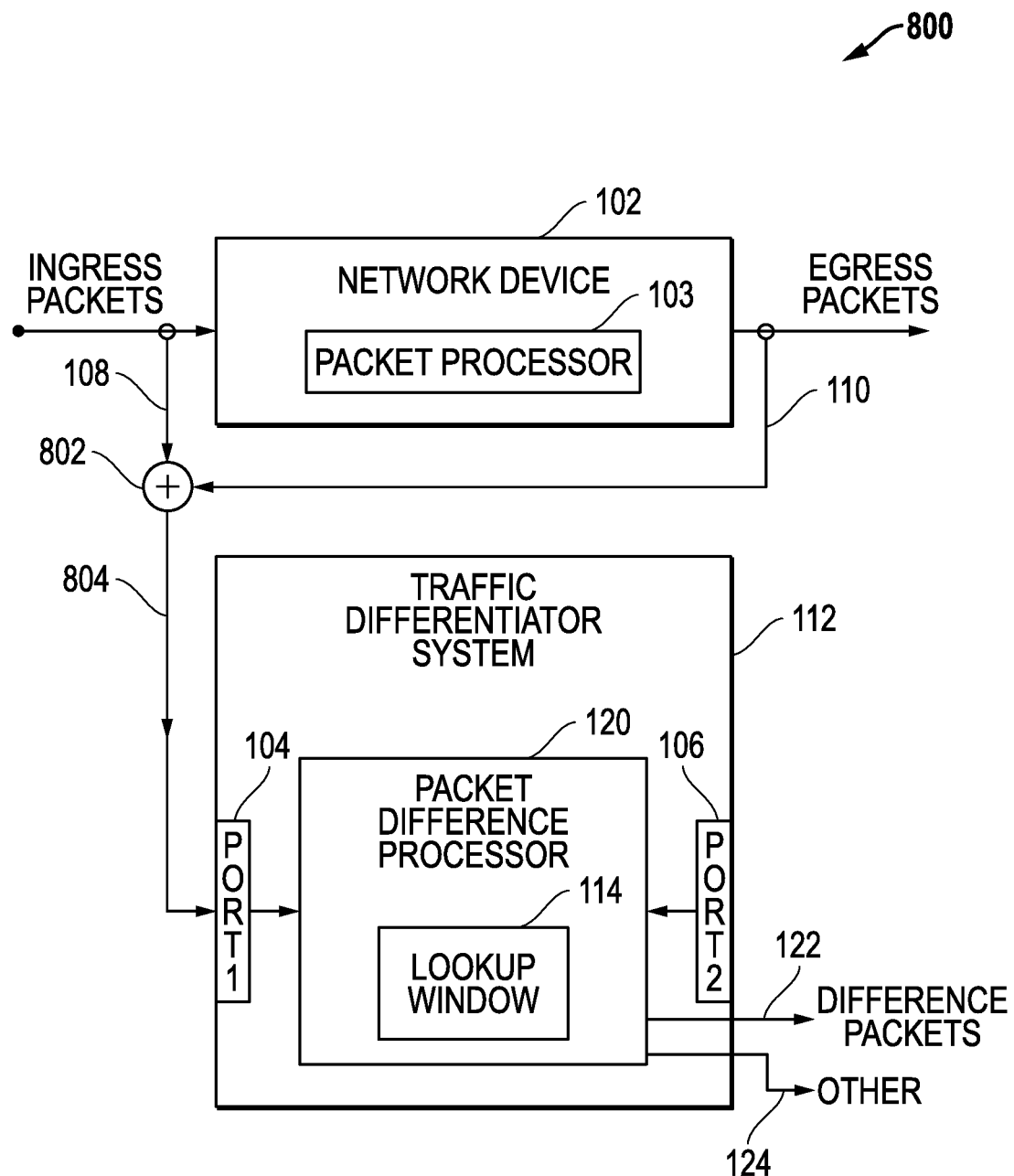
FIG. 8 is a block diagram of an example embodiment where ingress/egress streams from multiple ports are combined and then provided to an input port for a traffic differentiator system.
Figure 9:
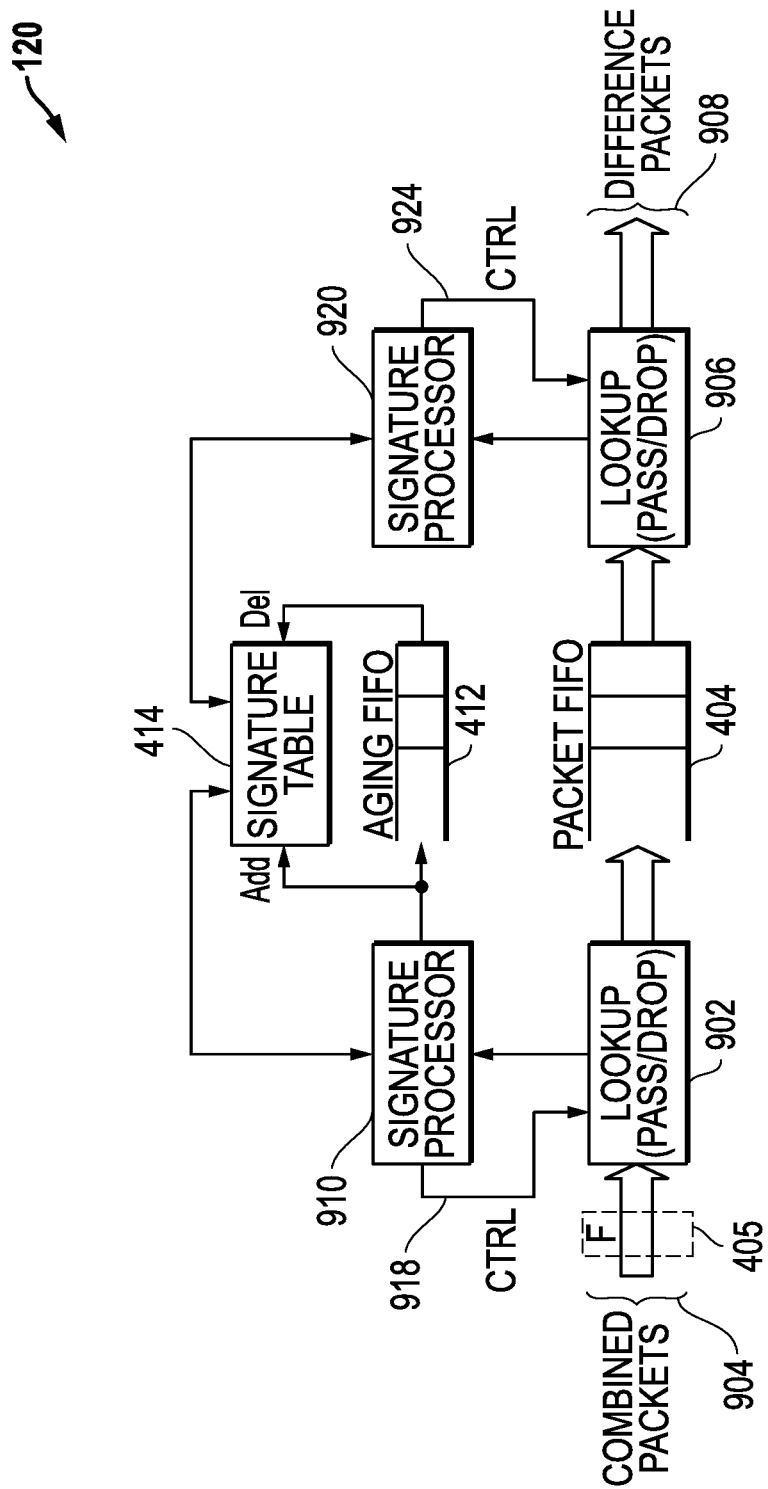
FIG. 9 is a block diagram of an example embodiment for processing a combined packet stream with a packet difference processor for a traffic differentiator system.

FIGS. 8-9 are now discussed and provide example embodiments where two packets streams, such as an ingress packet stream and an egress packet stream, are combined into a combined packet stream before being processed by a packet difference processor 120 for a traffic differentiator system 112. The combined packet stream can be received at an input port for the traffic differentiator system 112, or the packet streams can be combined within the traffic differentiator system 112. The packet streams can be combined by interleaving the two packet streams and/or using other desired aggregation techniques. Other variations can also be implemented.

Looking first to FIG. 8, a block diagram is provided of an example embodiment 800 where the traffic differentiator system 112 receives combined packets 804 at input port (PORT1) 104. For the embodiment 800 depicted, the network device 102 is configured to receive ingress packets and to output processed versions of these packets as egress packets using a packet processor 103. The traffic differentiator system 112 is configured to receive the combined packets 804 at the first port 104. Copies of the ingress packets 108 and copies of the egress packets 110 are combined by combiner 802 to form the combined packets 804. As described herein, the traffic differentiator system 112 determines differences between packet streams using the packet difference processor 120 and the lookup time window 114. The resulting difference packets 122 are output by the traffic differentiator system 112. The traffic differentiator system 112 can also be configured to output other information 124 related to the difference processing and difference packets, such as statistical information about the difference packets. Although combiner 802 is shown outside the traffic differentiator system, it is noted that ingress/egress packet streams 108/110 could be received at different ports for the traffic differentiator system 112 and could then be combined within the traffic differentiator system 112 prior to processing by the packet difference processor 120, if desired. Other variations could also be implemented.

FIG. 9 is a block diagram of an example embodiment for processing combined packets 904 with a packet difference processor 120 for a traffic differentiator system 112. For the embodiment depicted, two lookup operations 902/906 are performed with respect to the combined packets 904. The difference packets 908 represent packets within the combined packets 904 that are detected to be received only once in the combined packets 904 within a time window (W) 114. As described herein, the lookup time window (W) 114 determines how long packets and signature index values are stored within the buffers 404/412, which are each described in more detail below. It is further noted that for the embodiment of FIG. 9 applied to a network device 102, it is preferable that each ingress packet is received only once by the network device 102 and that each egress packet is output only once by the network device 102. Thus, when these ingress/egress packets are combined to form the combined packets 904 that are processed by the packet difference processor 120 depicted in FIG. 9, each ingress packet and each egress packet will occur only once within the combined packets 904 within the time window unless they represent packets added, dropped, or modified by the network device 102. These added/dropped/modified packets are output as difference packets 908 by the embodiment of FIG. 9.

Looking back to FIG. 9, lookup operation 902 is first performed on received packets within combined packets 904, and each received packet is sent to signature processor 910. The signature processor 910 generates a signature for the packet and sends the signature to signature table 414 to add it to the signatures stored in the signature table 414. The signature processor 910 also sends to aging buffer 412 an index within the signature table 414 for this signature, and this index is stored in aging buffer 412. The aging buffer 412 can be a first-in-first-out (FIFO) buffer or some other desired buffer that stores signature index values for a selected amount of time associated with the lookup time window described herein. When a signature index leaves the aging buffer 412, that index is provided to signature table 414 where it is used to delete the related signature from the signature table 414. As such, the packet signatures are stored for the lookup time window.

In addition to generating a signature and a signature index, the signature processor 910 also communicates with the signature table 414 to determine whether or not a signature stored within the signature table 414 matches the signature generated for the received packet. This determination is then communicated to lookup operation 902 using a control message (CTRL) 918. If the control message (CTRL) 918 indicates that a match was found, the lookup operation 902 will drop the packet so that it is not stored in the packet buffer 404, although the signature and index for this matched packet is still stored in the signature table 414 and aging buffer 412, as indicated above. If the control message (CTRL) 918 indicates that a match was not found, the lookup processor 902 will pass the packet to packet buffer 404 where it is stored. The packet buffer 404 can be a first-in-first-out (FIFO) buffer or some other buffer that stores packets for a selected amount of time associated with the lookup window described herein. Once this lookup window has passed, the packet buffer 404 sends the packet to lookup operation 906. As such, the packets are stored for the lookup time window. Further, as described above, after the lookup time window passes and the packet leaves the packet buffer 404, the index for the packet signature stored within the aging buffer 412 and the packet signature stored within the signature table 412 for the packet are also both removed, as the lookup time window will have passed.

The lookup operation 906 sends each packet it receives from packet buffer 404 to signature processor 920. The signature processor 920 generates a signature for each packet and communicates with the signature table 414 to determine whether or not a signature stored within the signature table 414 matches the signature generated for the packet received from the packet buffer 404. This determination is then communicated to lookup operation 906 using a control message (CTRL) 924. If the control message (CTRL) 924 indicates that a match was found, the lookup operation 906 will drop the packet. If the control message (CTRL) 924 indicates that a match was not found, the lookup processor 906 will output the packet as part of difference packets 908. As indicated above, the difference packets 908 represent packets that occur only once within the combined packets 904 within the lookup time window. For example, if an ingress packet and a matching egress packet are received within the lookup time window, a match will be found for the ingress packet and a match will also be found for the egress packet through the lookup operations. In particular, for the later received egress packet, lookup operation 902 will find the packet signature for the ingress packet within signature table 414 that matches the egress packet signature. As the egress packet is not stored in the packet buffer 404 once a match is found by lookup operation 902, lookup operation 906 is not performed on the egress packet although the egress packet signature and the related index are still stored in the signature table 414 and aging buffer 412, as described above. For the earlier received ingress packet, lookup operation 906 will find this packet signature for the egress packet within signature table 414 that matches the ingress packet signature. As the packet signature for the ingress packet is removed once its index ages out of the aging buffer 412 and the ingress packet is released from the packet buffer 404 after the lookup time window has passed, lookup operation 906 will not find a match to the ingress packet signature itself.

It is again noted that the packet contents for the difference packets 908 can be analyzed to provide additional statistical information concerning the difference packets, as desired. Further, as described above, the signature processors 910/920 can use a variety of techniques to generate signatures for received packets. For example, one or more hash algorithms can be applied to contents of received packets to generate signatures for the received packets. Further, the signature can be calculated using the full contents of the packet or using only select portions of the packet contents, as desired. Using only selected portions of the packet contents allows for one or more packet modifications that are done by the network device 102 to be ignored in the difference determination operations. As such, packets can still be detected as non-different copies of each other even though certain fields may have been updated or modified by the network device 102. For example, where the network device 102 updates the time-to-live (TTL) field within an IP (internet protocol) packet, adds/removes a VLAN (virtual local area network) tag within a packet, and/or performs other modifications to the packets, these packet modifications can be ignored in the difference processing by generating signatures that do not consider these portions of the packet. As described above, the signature is added to the signature table 414, and the index to the signature is added to the aging buffers 412. Other signature generation techniques could also be utilized, if desired.

In operation, the embodiment of FIG. 9 will detect difference packets 908 that represent packets received only once within the combined packets 904 within a certain lookup time window. This lookup time window is determined by the amount of time selected for the packet buffer 404 to store packets and for the aging buffer 412 to store signature index values. As also indicated above, the lookup time window can be selected based upon the expected processing time it takes for a packet to travel through and/or be processed by the network device 102 where packets entering one or more ports and leaving one or more ports on the network device 102 are combined to form the combined packets 904. The size of buffer 404/412 and the signature table 414 will be dependent upon the amount of time selected for the lookup window. Larger amounts of time will require larger buffers and tables, while smaller amounts of time will require smaller buffers and tables. It is noted that the buffers and tables can be implemented using any desired programmable storage medium, such as random access memory (RAM), FLASH memory, and/or other programmable data storage mediums.

As above, it is further noted that one or more packet filters 405 can also be used, for example prior to lookup operation 902, and can be configured to remove packets that are not desired to be considered within the difference processing. For example, the packet filter 405 can be used to drop packets having predefined packet types, such as for example packets generated inside the network device 102 that are not of significance. The packet filter 405, therefore, can be used to mask selected packets from the difference processing. While the packet filter 405 is shown as being in front of lookup operation 902, a packet filter could also be placed in different locations and additional packet filters could be utilized. As described above, the filters can apply one or more filter rules to determine whether or not to pass or drop received packets.

It is again noted that the ports or sources from which packets are received by the traffic differentiator system 112 could be associated with different network devices, if desired. Further, the packet streams being received could be packets streams that have been aggregated from one or more ports/sources. In short, while the traffic differentiator system 112 is useful for comparing differences between packets received by a network device 102 and packets output by that network device 102, the traffic differentiator system 112 can be used to determine difference packets between any desired packet streams provided to the traffic differentiator system 112 and within a single packet stream provided to the traffic differentiator system 112.

As indicated above, to facilitate the difference processing and to provide additional difference information associated with received packet streams, the traffic differentiator system 112 can also be configured to tag received packets with additional information and/or to count numbers of packets. For example, where the network device is a load balancer system, it is desirable to determine that each packet within a received ingress packet stream is only output once to a plurality of different received egress packet streams. Further, where the network device is a multi-casting system it is desirable to determine that each packet within a received ingress packet stream is output a selected number of times depending upon the number of egress streams being generated by the multicast processing. By tagging the received packets with port information and then tracking this port information along with counting the number of times particular packets are received, the traffic differentiator system 112 can provide determinations for load balancer systems, multi-casting systems, and/or other types of network devices. Other variations could also be implemented while still utilizing the lookup time window and difference processing techniques described herein.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A traffic differentiator system for network packets, comprising:
   a packet difference processor configured to determine difference packets within a lookup time window between a first stream of packets and a second stream of packets received by the traffic differentiator system, the second stream of packets representing a processed version of the first stream of packets, and the lookup time window being associated with a processing time for the second stream to be a processed version of the first stream; and
   at least one output port configured to output the difference packets, the difference packets comprising packets present in only one of the first and second streams within the lookup time window so as to include only packets within the first stream and not within the second stream and packets within the second stream and not within the first stream.

2. The traffic differentiator system of claim 1, wherein the packet difference processor is further configured to output statistical information about the difference packets.

3. The traffic differentiator system of claim 1, further comprising:
   at least one input port configured to receive the first stream of packets; and
   at least one additional input port configured to receive the second stream of packets.

4. The traffic differentiator system of claim 3, wherein the first and second streams of packets are from a single network device.

5. The traffic differentiator system of claim 4, wherein the first stream of packets includes only ingress packets for the network device and the second stream of packets includes only egress packets for the network device.

6. The traffic differentiator system of claim 4, wherein the difference packets represent at least one of packets removed by the network device, packets added by the network device, or packets modified by the network device.

7. The traffic differentiator system of claim 3, further comprising:

a packet signature generator associated with each input port and configured to generate a signature for each of a plurality of packets received at the input port; and a signature table associated with each input port and configured to store the signatures, the signature tables being configured to store signatures for the lookup time window.

8. The traffic differentiator system of claim 7, wherein the packet difference processor is further configured to perform for each input port at least one lookup between signatures generated for the packets received at that input port and the signature table associated with at least one other input port and to drop packets where matches are found.

9. The traffic differentiator system of claim 8, wherein the packet difference processor is configured to perform two lookups associated with each input port, and wherein a packet buffer stores packets between the two lookups.

10. The traffic differentiator system of claim 8, wherein the packet difference processor performs one lookup associated with each input port, and wherein a packet buffer stores packets before the lookup.

11. The traffic differentiator system of claim 8, wherein the input ports are configured to receive ingress packets or egress packets but not both, wherein the packet difference processor is configured to perform one lookup associated with each input port, and wherein a packet buffer stores packets for each input port configured to receive ingress packets.

12. The traffic differentiator system of claim 3, further comprising one or more packet filters associated with the input ports and configured to drop or pass packets based upon filter rules.

13. The traffic differentiator system of claim 1, wherein the first stream of packet includes only ingress packets associated with a network device, and wherein the second packet stream includes only egress packets associated with the network device.

14. The traffic differentiator system of claim 13, wherein the packet difference processor is configured to receive a combined packet stream including the first stream of ingress packets and the second stream of egress packets.

15. The traffic differentiator system of claim 14, further comprising an input port configured to receive the combined packet stream.

16. The traffic differentiator system of claim 15, further comprising:
a packet signature generator configured to generate a signature for each of a plurality of packets received at the input port; and
a signature table configured to store signatures for the lookup time window.

17. The traffic differentiator system of claim 16, wherein the packet difference processor is configured to perform two lookups associated with the input port and to drop packets where matches are found, and wherein a packet buffer stores packets between the two lookups.

18. The traffic differentiator system of claim 15, further comprising one or more packet filters associated with the input port and configured to drop or pass packets based upon filter rules.

19. A method for generating difference packets between streams of network packets, comprising:
determining difference packets within a lookup time window between a first stream of packets and a second stream of packets received by a traffic differentiator system, the second stream of packets representing a processed version of the first stream of packets, and the lookup time window being associated with a processing time for the second stream to be a processed version of the first stream; and
outputting the difference packets, the difference packets comprising packets present in only one of the first and second streams within the lookup time window so as to include only packets within the first stream and not within the second stream and packets within the second stream and not within the first stream.

20. The method of claim 19, further comprising outputting statistical information about the difference packets.

21. The method of claim 19, further comprising:
receiving the first stream of packets with at least one input port for the packet differentiator system; and
receiving the second stream of packets with at least one additional input port for the packet differentiator system.

22. The method of claim 21, wherein the first and second streams of packets are received from a single network device.

23. The method of claim 22, wherein the first stream of packets include only ingress packets for the network device and the second stream of packets includes only egress packets for the network device.

24. The method of claim 22, wherein the difference packets represent at least one of packets removed by the network device, packets added by the network device, or packets modified by the network device.

25. The method of claim 21, wherein the determining step comprises:
generating a signature for each of a plurality of packets received at the input ports;
storing the signatures for the lookup time window; and
comparing signatures to determine difference packets.

26. The method of claim 25, further comprising performing for each input port at least one lookup between signatures generated for the packets received at that input port and signatures stored for at least one other input port and dropping packets where matches are found.

27. The method of claim 26, wherein two lookups are performed for each input port, and further comprising storing packets between the two lookups.

28. The method of claim 26, wherein one lookup is performed for each input port, and further comprising storing packets before the lookup.

29. The method of claim 26, wherein the input ports are configured to receive ingress packets or egress packets but not both, wherein a lookup is performed at each input port for each other input port, and further comprising storing packets for each input port receiving ingress packets.

30. The method of claim 21, further comprising applying one or more packet filters to drop or pass packets based upon filter rules.

31. The method of claim 19, wherein the first stream of packet includes only ingress packets associated with a network device, and wherein the second packet stream includes only egress packets associated with the network device.

32. The method of claim 31, wherein the first stream of ingress packets and the second stream of egress packets are combined to form a combined packet stream.

33. The method of claim 32, further comprising receiving the combined packet stream at an input port for the packet differentiator system.

34. The method of claim 33, wherein the determining step comprises:

generating a signature for each of a plurality of packets received at the input port;
storing the signatures for the lookup time window; and
comparing signatures to determine difference packets.

35. The method of claim 34, further comprising performing two lookups between signatures generated for the packets received at the input port and stored signatures, and dropping packets where matches are found.

36. The method of claim 33, further applying one or more packet filters to drop or pass packets based upon filter rules.

* * * * *